United States Patent [19]

Clifton

[11] Patent Number: 5,197,365
[45] Date of Patent: Mar. 30, 1993

[54] MEASURING APPARATUS FOR MITRE SAWS, CUT-OFF SAWS, AND THE LIKE

[76] Inventor: Norman L. Clifton, 49 S. 875 West, Orem, Utah 84058-5267

[21] Appl. No.: 745,502

[22] Filed: Aug. 15, 1991

[51] Int. Cl.$^5$ .............................................. B26D 7/28
[52] U.S. Cl. .................................. 83/468; 83/471.3; 83/522.19
[58] Field of Search ............ 83/468, 468.3, 490, 83/522.15, 522.16, 522.17, 522.18, 522.19, 471.3

[56] References Cited

U.S. PATENT DOCUMENTS

| | | | |
|---|---|---|---|
| 2,619,134 | 11/1952 | West | 83/468 |
| 2,745,447 | 5/1956 | Studley, Jr. | 83/468 X |
| 2,747,625 | 5/1956 | Small | 83/468 |
| 3,807,269 | 4/1974 | Mertes | 83/468 |
| 3,811,196 | 5/1974 | Smith | 83/468 X |
| 4,557,170 | 12/1985 | Ingham | 83/468 |
| 4,745,834 | 5/1988 | Neumann | 83/468 |

*Primary Examiner*—Eugenia Jones
*Attorney, Agent, or Firm*—Thorpe, North & Western

[57] ABSTRACT

A measuring scale is disclosed for use in connection with a mitre saw, a cut-off saw, and similar cutting implement which includes a support surface on which a piece of wood to be cut is placed, and a saw blade operable to cut such a piece of wood. The measuring scale includes an upstanding backstop disposed to extend laterally in one direction from the saw blade above the support surface, against which the piece of wood may be placed for cutting, and a coilable tape measure having a casing for mounting on the backstop and a coiled tape disposed in the casing so that a free end thereof may be grasped to allow pulling the tape outwardly from the casing in the one direction. A marking is incribed in the backstop at a location on the other side of the casing from the saw blade. A scale is inscribed on the coiled tape and includes indicia for indicating the length of the piece of wood being cut when the free end of the tape is aligned with the adjacent end of the piece of wood. In particular, the indicia on the tape aligned with the marking on the backstop, when the free end of the tape is aligned with the end of a piece of wood, indicates the length of the piece being cut.

2 Claims, 2 Drawing Sheets

MEASURING APPARATUS FOR MITRE SAWS, CUT-OFF SAWS, AND THE LIKE

BACKGROUND OF THE INVENTION

This invention relates to apparatus installable on a conventional mitre saw, cut-off saw and the like to enable measuring the length of a piece of material to be cut by the saw.

In using mitre saws, cut-off saws, and similar cutting implements, it is standard practice to measure from one end the length of a piece of material to be cut from a larger piece, and make a marking of some kind at the location where cutting is to occur. The larger piece of material is then put in position on a support surface of the saw so that the marking is aligned with the saw blade, after which the piece of material is sawed in two at the marking by visual alignment of the saw blade with the marking. Among the problems with this procedure are (1) the need for manually measuring the length of the piece of material to be cut and then making a mark on the piece of material as close to the measured location of cutting as possible, and (2) the need for visually lining up the saw blade with respect to the marking to cut the piece of material at a location to hopefully yield a piece of material whose length corresponds to the measured length. Of course, if the marking is slightly offset from the desired measured distance, then the resulting piece of material will not meet the desired length. Also, where successive pieces of material are to be measured and cut, it is difficult to successively cut the pieces of material to have the same length. Finally, it can be time consuming to first measure the desired length to be cut, and then properly align the mark with the saw blade prior to cutting.

SUMMARY OF THE INVENTION

It is an object of the invention to provide measuring apparatus for use with mitre saws, cut-off saws and the like so that a length of a piece of material to be cut may be measured in place on the saw.

It is also an object of the invention to provide such measuring apparatus which is simple to construct and install on a conventional mitre saw, cut-off saw and the like.

It is a further object of the invention to provide such measuring apparatus utilizing conventional component parts.

It is an additional object of the invention to provide such measuring apparatus which may be utilized with little expenditure of time.

It is another object of the invention to provide such measuring apparatus which enables the more accurate measurement of the length of a piece of material to be cut by the saw on which the piece of material is placed.

The above and other objects of the invention are realized in a specific illustrative embodiment of apparatus for measuring the length of a piece of material to be cut by a conventional mitre saw, cut-off saw, or the like. Such a saw would include a support surface on which would rest a piece of material to be cut, and a saw blade operable to cut the piece of material resting on the support surface. The measuring apparatus includes an upstanding backstop disposed to extend laterally in one direction from the saw blade and above the support surface, against which the piece of material may be placed. The measuring apparatus also includes a measuring scale disposed on the backstop above the support surface to also extend laterally in the one direction from the saw blade so that the piece of material being cut lies adjacent the measuring scale. The measuring scale includes indicia for measuring the distance from the saw blade to an end of the piece of material which is positioned in the one direction from the saw blade.

In accordance with one aspect of the invention, the measuring scale includes a coilable tape measure having a casing for mounting on the backstop, and a coiled tape disposed in the casing so that a free end thereof is graspable to allow pulling the tape outwardly from the casing in said one direction to align the free end with said end of the piece of material. The tape includes indicia for indicating the distance from the saw blade of the end of the piece of material when such end is aligned with the free end of the tape.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
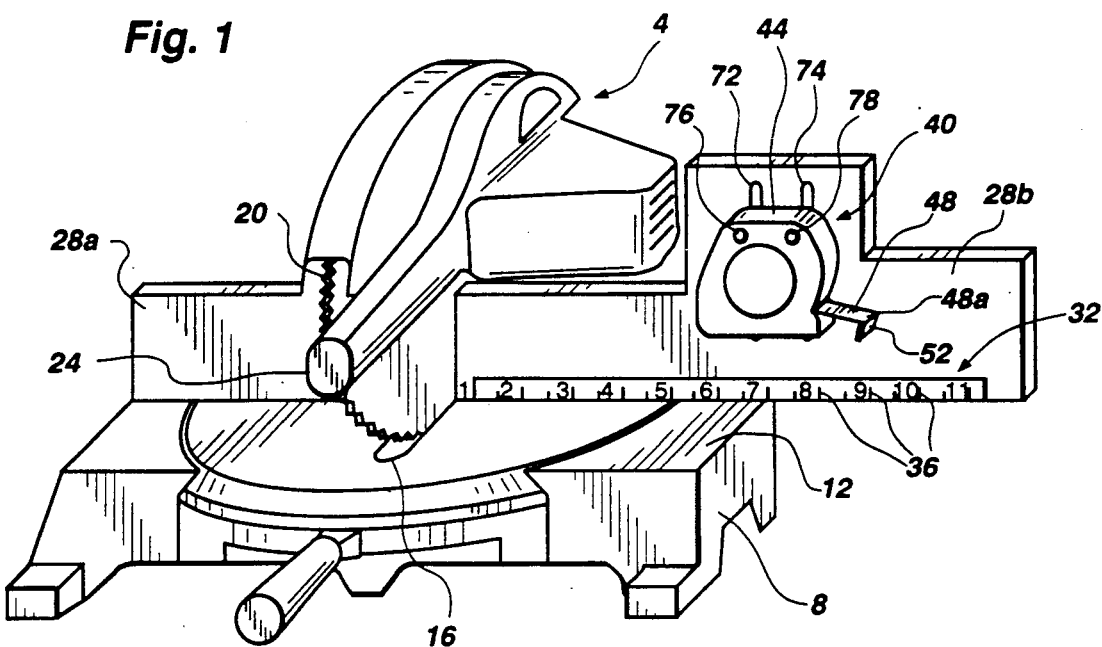
FIG. 1 shows a perspective view of a mitre saw on which is installed measuring apparatus made in accordance with the principles of the present invention.
Figure 4:
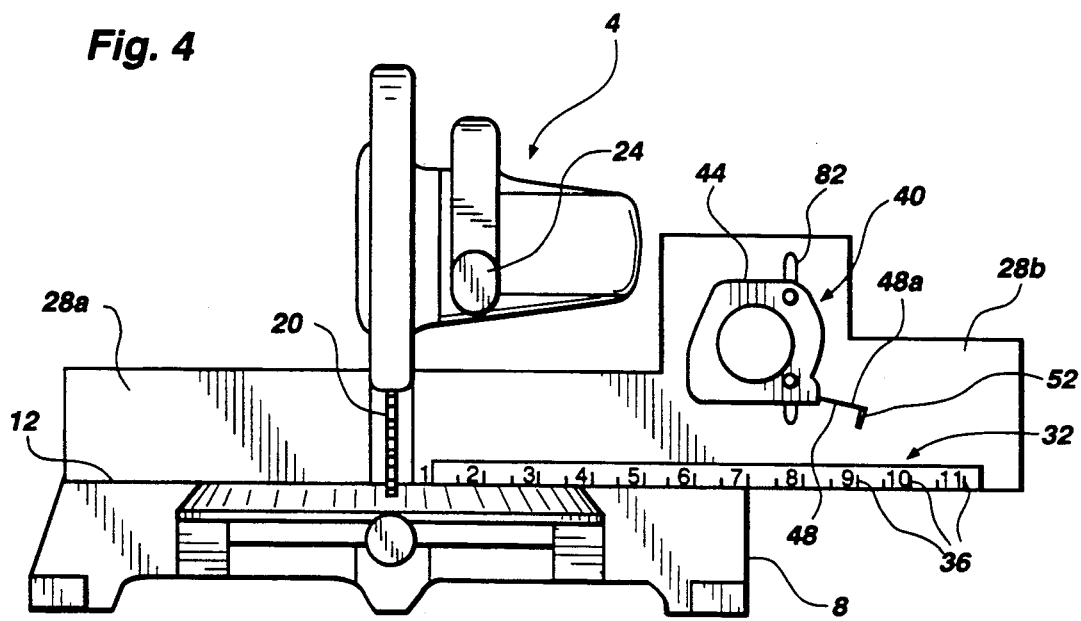
FIG. 4 shows a front, elevational view of the mitre saw and measuring apparatus of FIG. 1.

Referring to FIGS. 1 and 4, there is shown a conventional mitre saw 4 which includes a base portion 8 having a support surface 12 on which may be placed a piece of material, such as an elongate piece of wood which is to be cut. A slot 16 (FIG. 1) is formed in the support surface 12 for receiving the lower part of a circular saw blade 20. The saw blade 20 may be raised and lowered by manually grasping and respectively raising and lowering a handle 24. The saw blade 20 would be raised to allow placing on the support surface 12 a piece of material to be cut, and then lowered, while rotating under power, to cut the piece of material. The structure and operation of the mitre saw 4 is all conventional and forms no part of the present invention.

Disposed on the support surface 12 to extend laterally in both directions from the saw blade 20 is an upstanding backstop 28a and 28b. The backstop 28a and 28b comprises a substantially flat plate positioned generally at a right angle to the support surface 12. The backstop 28a and 28b may be secured to the mitre saw 4 by brackets or any conventional mechanism.

Formed on the backstop 28b to extend along the lower edge thereof laterally from the saw blade 20 is a linear measuring scale 32. The scale may be inscribed on the backstop 28b or inscribed on a strip of material and then attached to the backstop. The linear measuring scale 32 includes a plurality of equally spaced-apart indicia 36 whose indicated values increase in the direction away from the saw blade 20. For example, the first indicium on the scale 32 from the saw blade 20 is the numeral "1" indicating a distance of one inch, one centimeter, etc., as the case may be, from the saw blade, i.e., from the adjacent surface of the saw blade. The next indicium is identified by the numeral "2," and the next after that by "3," etc. to thereby indicate the distance laterally from the saw blade.

Mounted on the backstop 28b is a coilable tape measure 40 which is conventional except for the measuring scale formed on the tape as will be discussed momentarily. The coilable tape measure 40 includes a casing 44 in which is disposed a coiled tape 48, in a conventional fashion. A free end 48a of the tape 48 includes a conventional end hook 52 for hooking over the end of a piece of material such as a piece of wood 56 shown in phantom in FIG. 3. Inscribed on the tape 48 is a measuring scale having indicia 60 (FIG. 3) spaced apart from the free end of the tape and including numerals to identify distances from the saw blade 20 to a marking 64 inscribed on the backstop 28b. The scale on the tape 48 begins with a value, greater than "1," representing the distance of the end of the tape from the saw blade 20 when the end is aligned with the marking 64. The indicia 60 are identified by values which successively increase from the free end 48a of the tape towards the other end (located inside the casing 44). The reason for and use of this scale will be discussed momentarily.

Figure 2:
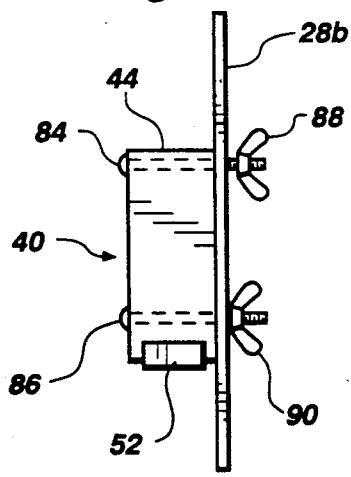
FIG. 2 is an elevational end view of a portion of the measuring apparatus of FIG. 1.
Figure 3:
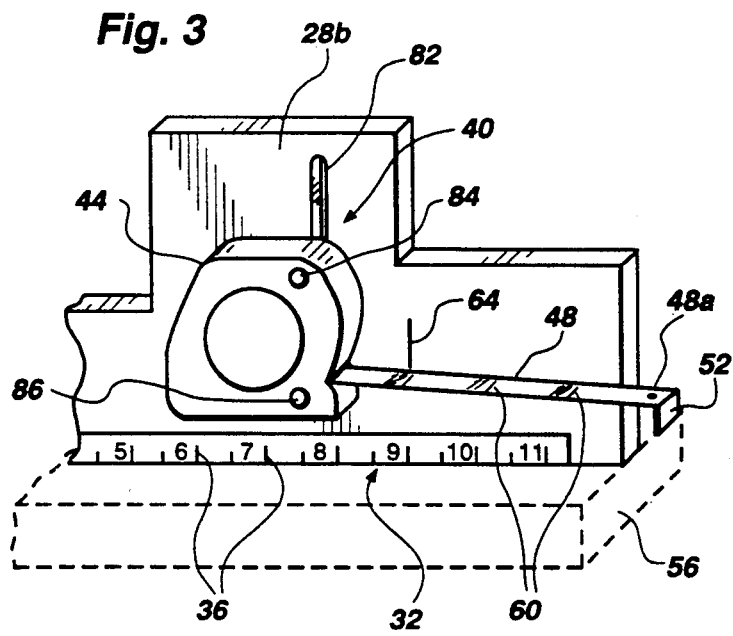
FIG. 3 is a perspective, fragmented view of a portion of the measuring apparatus of FIG. 1 positioned to illustrate the manner of making the desired measurements.

The tape measure 40 is mounted on the backstop 28b using a combination of slots in the backstop, bolts and wing nuts. FIG. 1 shows a pair of parallel, vertically positioned slots 72 and 74 formed in the backstop 28b, and a pair of bolts 76 and 78 extending through channels in the casing 44 of the tape measure and through the slots to allow nuts to be screwed onto the ends of the bolts protruding through the slots. FIGS. 2, 3 and 4 show a single, vertically-positioned slot 82 formed in the backstop 28b, and a pair of bolts 84 and 86 spaced apart vertically and extending through channels formed in the casing 44 of the tape measure and through the slot 82. Wing nuts 88 and 90 are screwable onto the bolt 84 and 86 respectively to contact the back of the backstop and secure the tape measure 40 in a fixed position. In either the attachment arrangement shown in FIG. 1 or that shown in FIGS. 2-4, the vertical positioning of the tape measure 40 may be adjusted by simply loosening the wing nuts, sliding the tape measure upwardly or downwardly, and then tightening the wing nuts again to secure the tape measure in the selected position. One wing nut would be sufficient, with the other nut being a conventional nut or washer to keep the respective bolt from moving out of the slot 82. Of course, a variety of other mechanisms could be provided for adjustably positioning the tape measure 40 on the backstop 28b.

In use, a piece of material such as an elongate board 56 shown in FIG. 3, may be placed on the support surface 12 of the mitre saw with the saw blade 20 in the raised position. The right end of the piece of material (looking at FIGS. 1, 3 or 4) would then be aligned with the indicia on the linear scale 32 corresponding to the desired length of the piece to be cut. For example, if a seven unit (such as inches) length were to be cut, then the right end of the piece of material would be aligned with the indicium identified by the numeral 7 and then the piece of material would be cut using the saw blade 20. Since the location of the indicium "7" is seven units to the right of the saw blade 20, the resulting cut piece of material would be seven units in length. If the piece of material to be cut were longer than the largest indicium value on the linear scale 32, then the free end 48a of the tape 48 would be pulled from the casing 44 of the tape measure and the end hook 52 would be positioned over the right end of the piece of material. The piece of material with the tape 48 hooked over the end thereof would be moved longitudinally until the indicium value on the tape 48 corresponding to the desired length to be cut were aligned with the marking 64 (FIG. 3) on the backstop 28b. Then, the piece of material would be cut with the saw blade 20 as described earlier. For example, if a 12 unit length were to be cut, then the piece of material 56, with the tape 48 hooked over the end of the piece, would be positioned longitudinally until the indicium identified by the numeral 12 aligned with the marking 64, as shown in FIG. 3. Cutting the piece of material 56 in this position would result in the cutting of a 12 unit length as desired.

Although the measuring apparatus of the present invention was described with respect to use in connection with a mitre saw, it should be apparent that the apparatus could be used in conjunction with a cut-off saw or any saw or other cutting implement having a saw or cutting blade and a support surface on which the piece of material may rest while being cut.

In the manner described, a simple and easy-to-use measuring apparatus is provided which allows for the simultaneous measurement of a piece of material to be cut while positioning the piece on the cutting implement. Because both the linear scale 32 and the coiled tape measure 40 are precisely positioned on the backstop 28b relative to the saw blade 20, very accurate measurements can be made of the length of material to be cut.

It is to be understood that the above-described arrangements are only illustrative of the application of the principles of the present invention. Numerous modifications and alternative arrangements may be devised by those skilled in the art without departing from the spirit and scope of the and the appended claims a e intended to cover such modifications and arrangements.

What is claimed is:

1. In combination in machinery for sawing with a saw blade disposed in a fixed position in the machinery, a support surface for supporting an elongate piece of material, apparatus for measuring the length of at least one of the two pieces of material resulting from sawing the elongate piece of material comprising a measuring implement disposed above the support surface to extend laterally in one direction from adjacent the saw blade so that the elongate piece of material being cut lies adjacent the measuring implement, said measuring implement including means for measuring the distance from the saw blade to an end of the piece of material positioned in said one direction from the saw blade;

wherein said measuring implement comprises a backstop disposed to extend upwardly from the support surface at a position laterally in said one direction from the saw blade, a coilable tape measure including a casing mounted on the backstop for holding a coiled tape and for allowing the pulling of one end of the tape in said one direction above the support surface, and the coiled tape being disposed in the casing so that a free end thereof is graspable to allow pulling the tape outwardly from the casing in said one direction away from the saw blade to affix said free end with said end of the elongate piece of material, said tape including indicia for indicating the distance from the saw blade of said end of the elongate piece of material when said end is aligned with the free end of the tape, and means for joining the coilable tape measure to the backstop so that the tape, when pulled from the casing, is generally parallel with the support surface to overlie the elongate piece of material, wherein said joining means includes means for adjusting the height of the coilable tape measure above the support surface.

2. Apparatus as in claim 1 wherein said adjusting means includes
   a vertically positioned slot formed in the backstop,
   a bolt extending from a side of the casing through the slot, and
   a nut screwable onto the end of the bolt extending through the slot to contact the backstop and secure the bolt and the casing in fixed position relative to the backstop.

* * * * *